April 13, 1937.    K. E. SPIRES ET AL    2,076,749
ROTARY DICER
Filed July 25, 1934    2 Sheets-Sheet 1
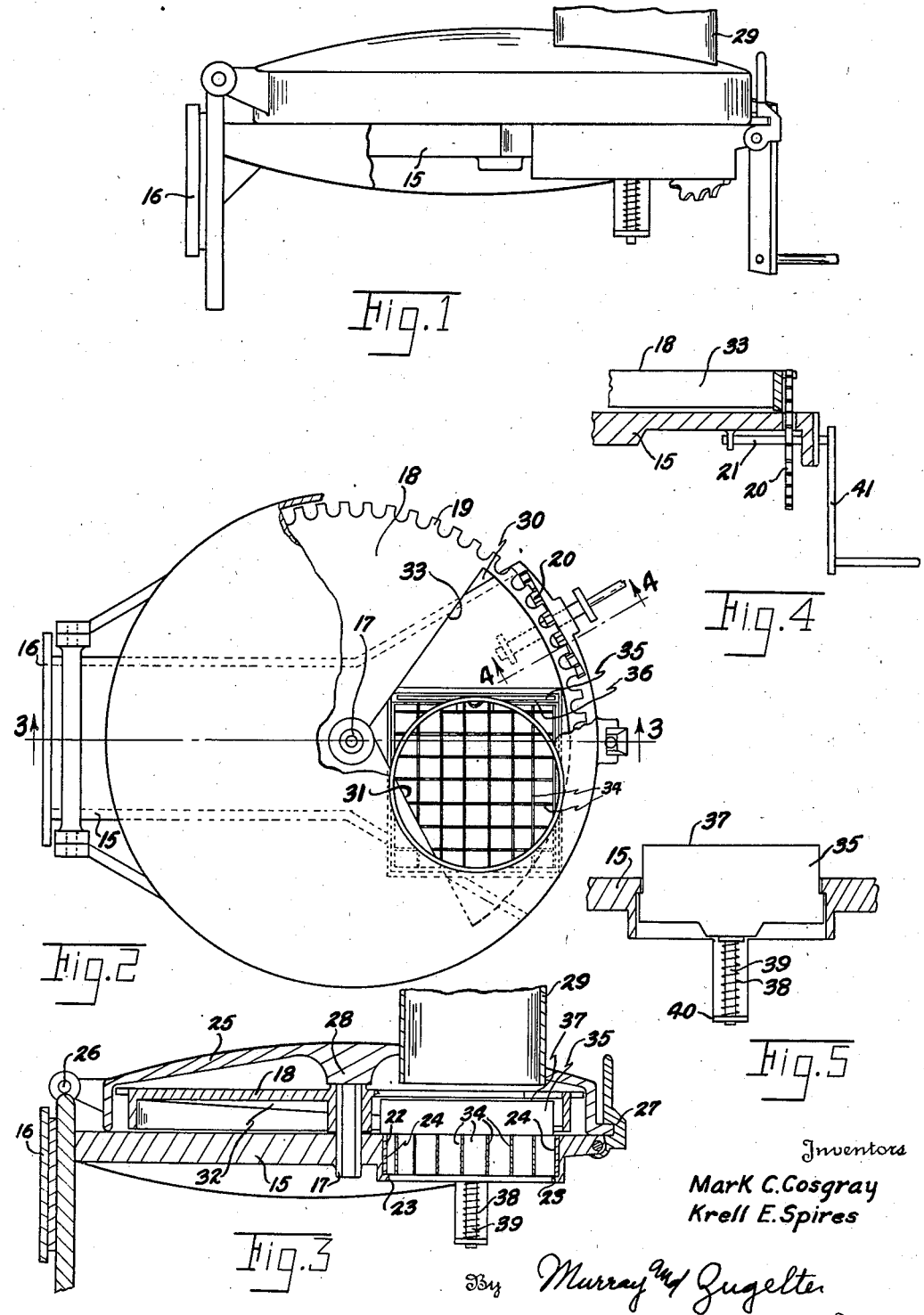
Inventors
Mark C. Cosgray
Krell E. Spires
By Murray and Zugelter
Attorneys

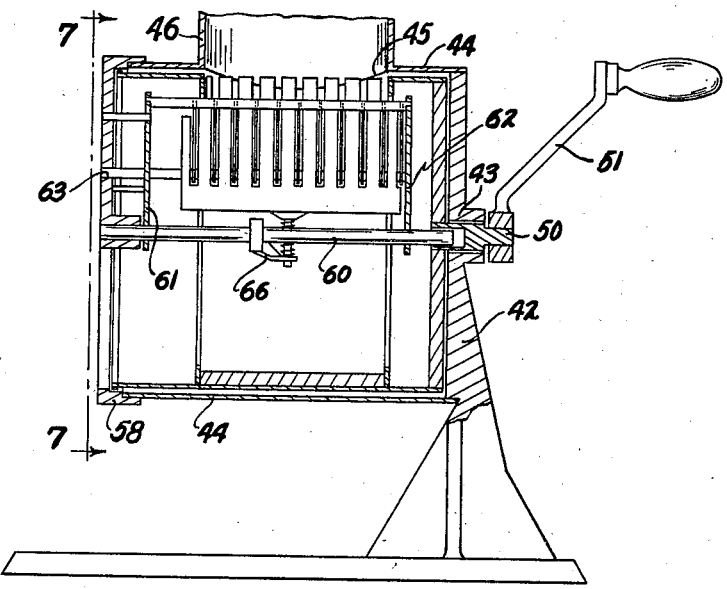
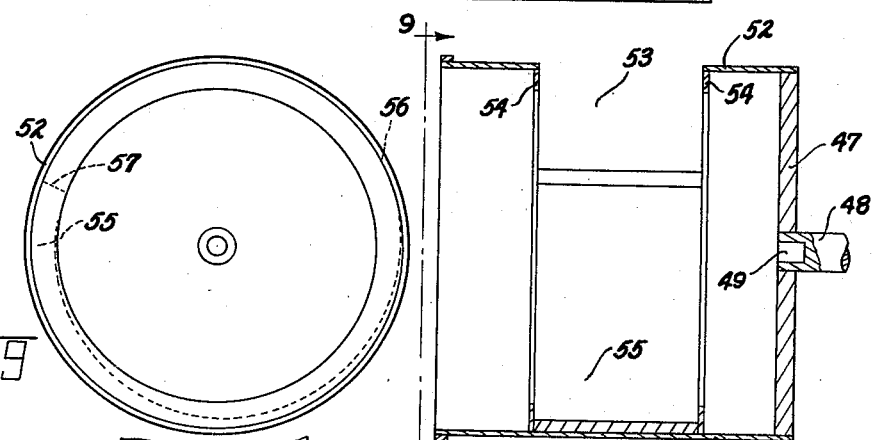
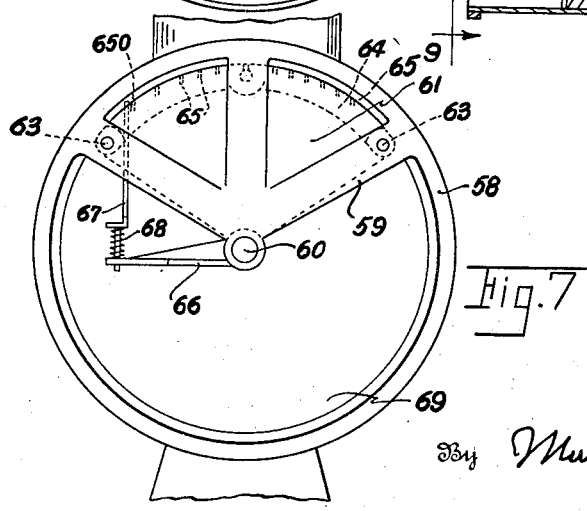

Patented Apr. 13, 1937

2,076,749

UNITED STATES PATENT OFFICE 2,076,749

ROTARY DICER

Krell E. Spires, Dayton, and Mark C. Cosgray, Cincinnati, Ohio

Application July 25, 1934, Serial No. 736,920

9 Claims. (Cl. 146—78)

The present invention relates to a rotary dicer and has for its principal object the provision of a simple and relatively inexpensive arrangement of parts whereby foodstuffs and the like are divided into cube form pieces. The invention comprehends the adaptation of the device to both domestic and commercial uses and contemplates actuation either manually or otherwise.

Amongst other objects of the invention is the provision of a device that is adapted, by the use of expedients known in the art, to also operate as a slicer, grater or shredder.

These and other objects are attained by the means described herein and disclosed in several of the contemplated forms in the accompanying drawings, in which:

Fig. 1 is a side elevational view of a device of the invention having a disc type cutter.

Fig. 2 is a top plan view of the device of Fig. 1, parts being broken away.

Fig. 3 is a view taken on line 3—3 of Fig. 2.

Fig. 4 is a view taken on line 4—4 of Fig. 2.

Fig. 5 is an elevational view of a retiring baffle and its mounting, the latter being shown in cross section.

Fig. 6 is a vertical section of a device of the invention as embodying a cylindrical rotary cutter.

Fig. 7 is a view taken on line 7—7 of Fig. 6.

Fig. 8 is a vertical section of the cutter of Fig. 6.

Fig. 9 is a view taken on line 9—9 of Fig. 8.

In all of the contemplated forms the device consists essentially of a hopper to receive fruits, nuts, vegetables, or other substances, a removable dicing knife die, a rotary cutter which passes between the bottom of the hopper and said die and which has its shear face progressively sloping away from the cutting edge and serving to push the severed material through the dicing die, and a yieldable baffle which initially takes the thrust of the cutter on the substance to be cut and then retires uniformly with the shear face of the cutter until it clears the level of the dicer die.

It has been found that numerous attempts have been made to produce a compact, simple and inexpensive device for the purpose but that these attempts have been unsuccessful. Slicers and dicers have been made for hotel kitchens, canneries, etc., but they have invariably operated on more complex principles that are not adaptable to household devices. The present invention is readily adaptable to all uses, both commercial and domestic, either manually or power driven.

Referring to Fig. 1 a body member 15 arranged for suitable mounting such as wall mounting in a grooved bracket (not shown) through the agency of an undercut mounting lug 16 has a center stud 17 upon which a disc type cutter 18 is revolubly and removably mounted. The cutter member in this embodiment is provided with peripheral gear teeth 19 meshing with a pinion 20 on a rotatable shaft 21 journalled in the body member 15, as shown in Fig. 4.

The body 15 has a preferably rectangular aperture or seat 22 therein having at its bottom a pair of shoulders 23 upon which the frame 24 of a dicing die may rest. The body 15 also has a cover 25 hingedly mounted thereon at 26 and adapted to have its free side latched by a latch member 27. The center boss 28 of the cover 25 rests upon a stud 17 and the hub of the cutter is given a slight clearance between the bottom of said boss and the top of said body 15. A hopper 29 of any suitable cross section that will direct material to be diced onto a major portion of the dicer die, is mounted in a suitable aperture in the cover 25 as can be clearly seen in Figs. 2 and 3. It is to be understood that the shape of the hopper and of the dicer die are limited only by the necessary cooperation in guiding and dicing of foodstuffs, etc., and by choice of design.

The cutter 18 has an aperture 30 therein of a size somewhat greater than that of the size of the dicer die and hopper and that this aperture is bounded by two angularly disposed straight edges. One of these edges 31 is a cutting edge and is so disposed as to afford a shearing cut. The bottom or shearing face 32 of the cutter disc 18 tapers progressively away from the plane of the cutting edge toward the finishing edge 33 which bounds aperture 30 at which line said shearing face is in a plane which just clears the top edges of the dicer frame 24 and the knives 34 mounted therein in intersecting relation. The top face of the cutter may either be disposed in a plane with the cutting edge thereby making the cutter thickest at the finishing edge, as shown or the cutter blade portion of the disc may be of uniform thickness, in which case, the top face would follow parallel to the shearing face. Rotary slicing discs of the general type described have been known in the past but they have been entirely unsatisfactory and ineffective in conjunction with a dicer because the severed portion of foodstuff was either badly mashed and compacted or it was forced off of the dicer instead of through it.

The present invention overcomes the faults that rendered the past efforts unsuccessful by providing a retiring baffle member suitably guided in this case between the face of the aperture 22 in body 15 and the adjacent side 36 of the dicer die frame. As will be readily seen in Fig. 5, this baffle has an upper limit wherein the top of the baffle extends above the top of body 15 and the top of said dicer die for a distance that just clears the sharp cutting edge 31 of the rotating cutter. Any suitable means may be used for lifting the baffle 35 so that its top edge 37 may actually or substantially ride on the tapered or inclined shear face 32 of the cutter disc. The face 32 may be used as a positive cam face as shown herein to lower the baffle progressively as this same face 32 forces the severed material through the dicer die. The material in the hopper is supported by the top face of the cutter until fishing edge 33 passes the hopper whereupon said supported material drops down to the dicer die. It has been found that the described cooperative relation of the cutter disc, dicer die and baffle is such that various means for raising the baffle may be used. A simple compression spring 38 (see Figs. 3 and 5) encircling a guide pin 39 on the bottom of the baffle and abutting the perforated guide member 40 serves this purpose.

The operation of the device described is as follows: assuming that the device has been assembled by inserting the dicer die of desired mesh into its seat and then seating the rotary cutter 18 upon pin 17 and then lowering the cover 25 and latching it, the user would then place the material to be diced, such as vegetables of various kinds, fruits, nuts, etc., into the hopper and rotate the member 18 by turning the crank 41. In the case of small substances such as nuts, the cutting edge 31 would naturally sever only larger and more upstanding pieces and the progressive incline on the bottom face of the rotary cutter would force the substance below the face thereof through the dicer die. The baffle 35 would have its top edge 37 following the lower face 32 of the rotary cutter so that no particles could be advanced laterally across the face of the dicer die, but all of them would be forced downwardly into the dicer. Upon the event of the finishing edge 33 of the rotary cutter passing the baffle, the spring 38 would raise the baffle. The aperture in the rotary cutter would then be in registry with the dicer die and that portion of the substance to be divided which had previously been riding upon the top face of the rotary cutter would descend to the level of the dicer die. Further rotation would again pass the cutting edge 31 through material and the operation would be repeated, any particles which had remained in the several spaces between the dicing knives being dislodged by the next incoming pieces.

In preparing such substances as potatoes, carrots, etc., the tubers would be cut into pieces of a size that could be entered into the hopper without the necessity of being forced, and thereupon the entire piece would be reduced to uniform cubes without the necessity of any pressure upon the material in the hopper. The rotation of the knife disc would serve to progressively and uniformly slice through the article that rested on the dicer, the baffle during this cutting interval always blocking the space between the top of the dicer and the bottom of the blade, and the inclined lower surface of the rotary cutter would at the same time progressively push the slice downwardly into the dicer die. The operation can be pursued as rapidly as it is possible to turn the crank. In the case of power drive, it is possible to speed up the cutter and to have the device operate without clogging at very high speeds. The particular guided relation of the baffle is such that there is no opportunity for binding or clogging of foodstuff about the baffle and it has been found that the simple spring return will provide non-failing results.

Referring now to Figs. 6 to 9 inclusive, wherein the device has been illustrated with a cylindrical type of rotary cutter, a suitable upright 42 has a hollow hub 43 therein which is concentric with an outer cylinder 44 which has an aperture 45 surrounded by hopper 46. This assembly constitutes one of the three major sections of this device. The rotatable cutter assembly (see Fig. 8 and Fig. 9) comprises a disc-like member 47 having a stud portion 48 counterbored at 49 and adapted to receive upon the reduced outer end 50 thereof a handle crank 51.

A cylindrical portion 52 is fixed onto the disc 47 and has a cut out aperture 53 intermediate its opposite ends and of a width substantially corresponding to the width or diameter of the hopper. A strengthening flange 54 completely encircles the interior of cylinder 52 on opposite sides of this aperture and assists in locating and mounting the curved tapered cutting blade indicated generally as 55. As can best be seen in dotted lines in Fig. 9, the cutting blade 55 has the cutting edge 56 thereof at one side of aperture 53 and the finishing edge 57 marking the opposite side of the aperture. These parts in assembled condition bear the relation shown in Fig. 6.

The dicer die in this modification assumes the contour of the cylinders and is spaced therefrom at a distance equal to the thickness of the cut of material to be made. End cap 58 is of annular form and is shouldered to have a tight sliding fit on the outer end of fixed cylinder 44. An integral web 59 on the end cap has a hub in which is fixed a rod 60, the free end of which extends into the opening 49 in the rotating cutter hub which rotates about it. On the rod 60 are mounted segmental plates 61 and 62 which are further held in spaced relation by rods 63 upon which are threaded the arcuate dicer knives 64 which in turn support the intersecting longitudinally extending dicer knives 65. The dicer knives together form a rib-like cutting structure all of which is rigidly and non-rotatably supported beneath the hopper on rod 60. An arm 66 is also suitably fixed on rod 60 and carries a yieldable baffle 67 which preferably rides between and is guided on the endmost cutter blade 650 and the spacers which separate the arcuate knives 64 on rod 63. The baffle is slotted so that the sections thereof straddle the arcuate knives 64. The rods 63 are anchored in the end cap and these together with the blades form a rigid support for the dicer die. From the foregoing, it will readily be appreciated that the rotary cylindrical cutter operates freely within the outer fixed cylinder 44 and between said cylinder and the dicing die. A spring 68 is used to urge the baffle upwardly so that in its uppermost position, the cutting edge 56 of the knife will clear it and the inner or shearing face of the cutter will thereafter push the baffle downwardly against the yielding resistance of spring 68. In this form of device the severed particles of foodstuff have a rectangular cross section but take the slight curvature of the blade on the upper and lower faces thereof. The interior of the device being substantially open and the end cap being likewise open in the lower portion thereof allows the diced particles to thumble about and drop from the opening 69.

The construction illustrated is adaptable to the relatively cheap metal stamping type of fabrication but it need not within the spirit and scope of this invention necessarily be so made. It is to be understood that in the embodiment illustrated in Fig. 1 and Fig. 6 a single cutting edge has been shown. It is contemplated that in larger embodiments where the circumference of the flat rotary cutter or of the cylindrical rotary cutter permits there may be additional cutting and finishing edges provided within the single circumference in order to increase the output rate of the device. The embodiments shown are for the purpose of illustrating the preferred form of the devices in their simpler embodiments.

What is claimed is:

1. In a device of the class described the combination of a hopper for material to be reduced to small and substantially uniform pieces, a cutting die presenting connected cutting edges in the discharge path of and in spaced relation to said hopper, a rotary cutter between the hopper and die operable on material extending from the hopper and comprising a tapered bottom face whereby the severed material is forced into the die and means mounted adjacent one side of the die, and moving cyclically with the tapered face of the cutter at right angles to the plane of cutting, to preclude movement of the severed material across the face of the cutting die.

2. In a device of the class described the combination of a mounting member, a die carried thereby, a hopper mounted above said die, a rotary cutter operating across the bottom of the hopper to sever material extending therebelow, tapered means on the cutter to force the severed material into the die, means to rotate the cutter and a baffle yieldably mounted in the path of the cutter for precluding movement of severed material across the face of the die by the movement of the cutter, said baffle moving uniformly with said tapered means and in a plane at an angle thereto.

3. In a device of the class described the combination of a mounting member, a die carried thereby, a movable cover member, a hopper on said cover member having its discharge end above and spaced from the die, a rotary cutter disc having a substantially sector shaped opening providing for a cutting edge and a finish edge, said cutting edge having shearing action across the discharge end of the hopper, said disc being removably journalled between said mounting member and cover member, the bottom face of the disc being increasingly thicker from the cutting edge to the finish edge, said finish edge having a path of travel in a plane substantially uniform with the plane of the top edges of the die, a yieldably mounted baffle at one side of the die for movement in a plane angularly of the bottom face of the disc as the disc is rotated and adapted to be depressed by the bottom face of the disc and means to rotate the disc.

4. In a device of the class described the combination of a suitably mounted dicing die, a hopper to direct substance to be cut to said die, a rotary cutter operable between the die and hopper, a tapered face on said cutter to progressively move the severed material into the die and a movable baffle adjacent the die automatically raising and lowering between the plane of the die and the plane of said tapered face as the cutter is rotated to preclude movement of severed material across the face of the die.

5. In a dicer the combination of a hopper having a discharge opening, a dicing die spaced from said opening, a depressible baffle disposed at one side of the die and adapted for reciprocation in a plane at right angles to the plane of the die and a rotary cutter mounted between the hopper and die having a clearance face inclined from the cutting edge to the finishing edge with relation to the die whereby material severed by the cutting edge is progressively forced through the die, said baffle being progressively depressed as the finishing edge of the clearance face of the cutter approaches the baffle.

6. In a rotary dicer the combination of a fixed hollow cylindrical member having a hopper opening in the wall thereof, a semi-cylindrical cutter rotatable in said cylindrical member and having a tapering clearance face, an apertured end cap on the cylindrical member, a dicer die, means supporting said die interiorly of the cylindrical member and spaced radially inwardly from the hopper opening and a shiftable baffle yieldably urged to contact with the tapered clearance face of the cutter and automatically reciprocated by movement of said cutter.

7. In a rotary dicer a fixedly mounted hollow cylindrical housing, a concentric hollow cylinder mounted for rotation within the housing, the housing and cylinder having registerable openings in the walls thereof, a cutter on the rotatable cylinder and having its cutting edge at one side of the opening therein and its finishing edge terminating at the opposite side of said opening, said cutter having a clearance face progressively tapering from the cutting edge to the finish edge, an arcuate dicer die disposed within the hollow rotatable cylinder but non-rotatable therewith and having its top face substantially in a plane with the finishing face of said cutter and a yieldable baffle at the side of the dicer die and adapted to be depressed by said inclined face of the cutter.

8. In a device of the class described the combination of a suitably supported dicing die, a hopper to direct substance to be cut to said die, a movable cutter operable between the die and hopper and a baffle shiftable edgewise in a plane transversely of the plane of the die at one side thereof and means comprising an inclined face on the body of the cutter contacting the baffle to cyclically shift said baffle out of the path of the cutter and move the severed material through the die.

9. In a device of the class described the combination of a suitably mounted dicing die, a hopper to direct substance to be cut to said die, a rotary cutter member operable between the die and hopper, a tapered face on said cutter member arranged to contact and to progressively move the severed material into the die and a movable baffle adjacent the die and at one side thereof constructed and arranged to automatically shift between the plane of the die and the tapered face as the cutter is rotated to preclude movement of the severed material across the face of the die.

KRELL E. SPIRES.
MARK C. COSGRAY.